D. L. GIBSON.
PARCEL POST SCALE.
APPLICATION FILED MAY 15, 1917.
1,254,495. Patented Jan. 22, 1918.
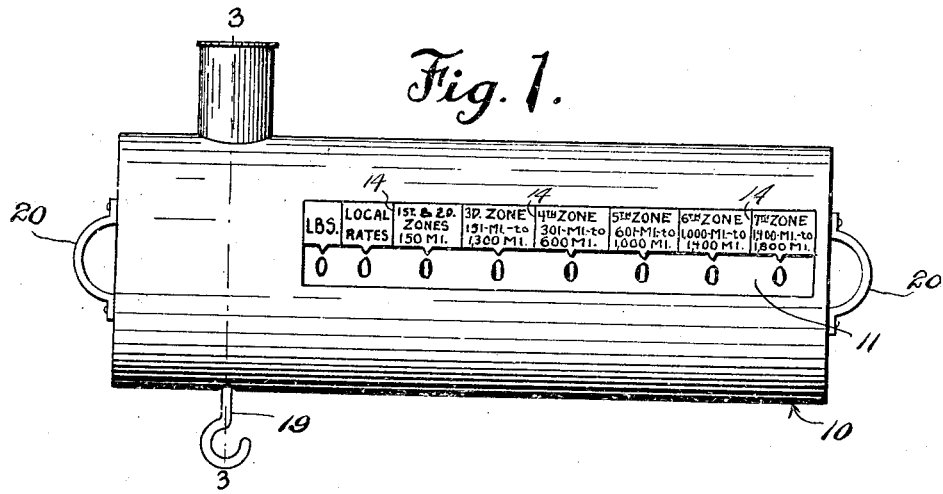
*Fig. 1.*
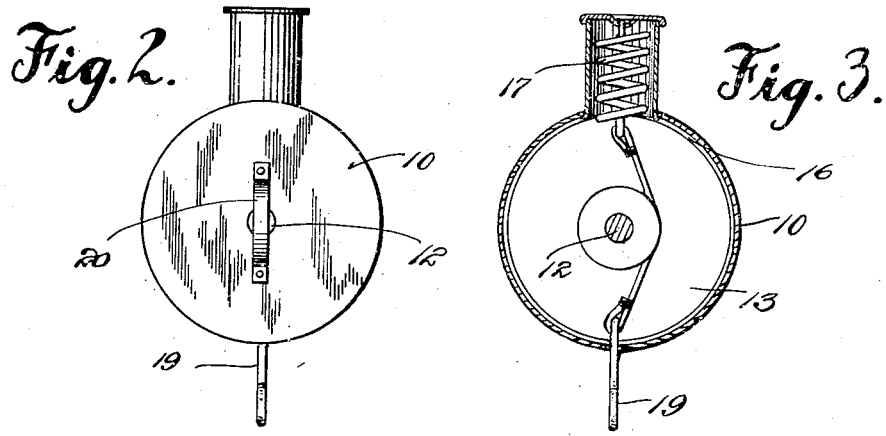
*Fig. 2.*  *Fig. 3.*
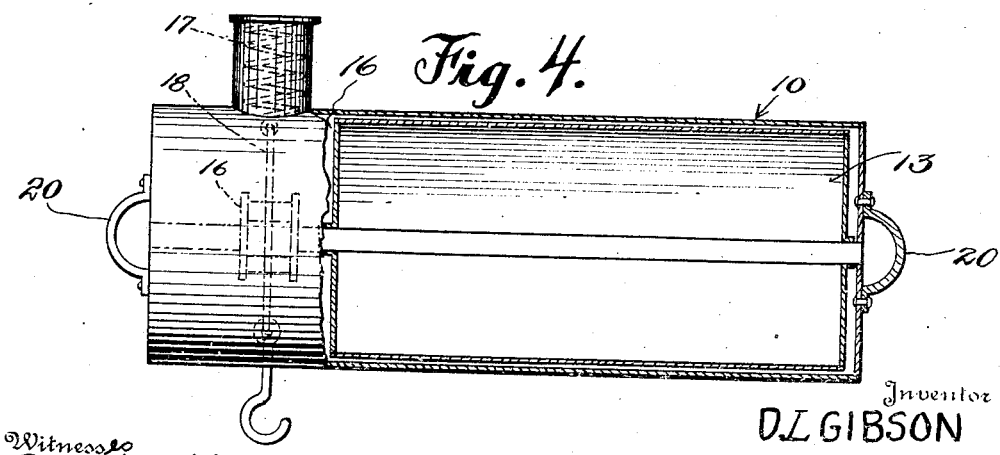
*Fig. 4.*
Witnesses
R. Wakefield
H. M. Test
Inventor
D. L. GIBSON
By 
Attorneys

UNITED STATES PATENT OFFICE.

DONALD L. GIBSON, OF DELTON, WISCONSIN.

PARCEL-POST SCALE.

1,254,495.  Specification of Letters Patent.  Patented Jan. 22, 1918.

Application filed May 15, 1917. Serial No. 168,785.

*To all whom it may concern:*

Be it known that I, DONALD L. GIBSON, a citizen of the United States, residing at Delton, in the county of Sauk, State of Wisconsin, have invented certain new and useful Improvements in Parcel-Post Scales; and I do hereby declare the following to be a full, clear, and exact description of the invention, such as will enable others skilled in the art to which it appertains to make and use the same.

This invention relates to improvements in weighing scales and particularly to scales for weighing parcel post packages.

One object of the present invention is to provide a simple and cheap device of this character which can be conveniently handled for weighing packages of different sizes.

Other objects and advantages will be apparent from the following description when taken in connection with the accompanying drawing.

In the accompanying drawing:

Figure 1 is an elevation of a parcel post weighing scales made in accordance with my invention.

Fig. 2 is an end elevation of the same.

Fig. 3 is a vertical sectional view taken on the line 3—3 of Fig. 1.

Fig. 4 is an elevation of the device, part of which is shown in vertical longitudinal central section.

Referring particularly to the accompanying drawing 10 represents an elongated cylindrical casing in which is formed the longitudinal slot 11. Extending through the center of the casing, and journaled at its ends in the ends of the casing, is a shaft 12. Secured on this shaft within the casing, and arranged to turn therewith, is a drum 13. The outer face of the casing, above the slot, is divided by the vertical lines 14, and between these lines there is printed, or otherwise formed on the surface of the casing, the numbers and distances of the different parcel post zones. In the first space of the casing there is printed the word "Pounds", and in the next space the words "Local rates". The surface of the drum is divided circumferentially in the same manner as the casing, and in the different spaces there are printed the prices for the different numbers of pounds in the different zones, these being arranged to be displayed through the slot of the casing beneath the spaces of the zone numbers. In the first space of the drum there are printed numbers from 1 up to any number desired, these numbers being arranged to be displayed under the word "Pounds" on the casing.

At one end of the casing there is formed a compartment 15 through which the adjacent end of the shaft passes and on this portion of the shaft there is secured a grooved drum 16. In the upper portion of the compartment there is formed a smaller compartment and in this compartment there is secured one end of a coil spring 17, the other end being connected to one end of a cord 18 which is wound several times around said drum 16. The other end of the cord is secured to a hook 19 which depends from the bottom of the compartment for holding packages to be weighed.

On each end of the casing there is secured a loop 20, these loops being adapted to be grasped to hold the scales up for the purpose of viewing the face of the drum through the slot of the casing, and ascertaining the weight and cost of the package on the hook, to any particular zone.

The device is extremely simple, cheap and compact in its structure, and can be easily manipulated for the purpose of weighing either small or large packages.

What is claimed is:

A weighing scale including a casing having a longitudinal slot in the front wall thereof, a drum mounted in the casing and having a shaft journaled in the ends of the casing, said drum being visible through said slot, a grooved drum secured on the shaft within the casing, a spring disposed above the drum and connected to the casing, a cord wound around the grooved drum and carrying a hook on the lower end and connected to the spring at its upper end, and handles on the ends of the casing whereby the device can be conveniently lifted and held while weighing packages.

In testimony whereof, I affix my signature in the presence of two witnesses.

DONALD L. GIBSON.

Witnesses:
M. C. CRANDALL,
C. E. MAVES.

Copies of this patent may be obtained for five cents each, by addressing the "Commissioner of Patents, Washington, D. C."